United States Patent

[11] 3,539,003

| [72] | Inventor | Jan Ivan Bidwell |
| | | Cornwall, England |
| [21] | Appl. No. | 743,599 |
| [22] | Filed | July 10, 1968 |
| [45] | Patented | Nov. 10, 1970 |
| [73] | Assignee | English Clays Lovering Pochin & Company Limited |
| | | Cornwall, England |
| | | a British Company |
| [32] | Priority | July 14, 1967, |
| [33] | | Great Britain |
| [31] | | 32,498/67 |

[54] SEPARATION OF MINERALS
15 Claims, No Drawings

[52] U.S. Cl. ............................................. 209/5,
 106/288, 23/110
[51] Int. Cl. ............................................. B03d 3/06
[50] Field of Search ............................................. 209/51;
 106/72, 288; 23/110.2

[56] References Cited
UNITED STATES PATENTS

| 1,324,958 | 12/1919 | Felenheimer | 209/5 |
| 2,149,748 | 3/1939 | Samuel | 209/5X |
| 2,981,630 | 4/1961 | Rowland | 209/5X |
| 3,399,068 | 8/1968 | Morton | 106/72 |

FOREIGN PATENTS

| 471,554 | 9/1937 | Great Britain | 23/110.2 |

*Primary Examiner*—Frank W. Lutter
*Assistant Examiner*—Robert Halper
*Attorney*—Stevens, Davis, Miller & Mosher ABSTRACT: A method of separating quartz from a clay mineral containing the same as impurity, which method comprises the steps of (a) forming an aqueous suspension comprising not more than 20 percent by weight of the clay mineral containing the quartz impurity, from 0.05 to 0.5 percent by weight of a deflocculant based on the total weight of solids in the suspension, from 0.005 to 0.1 percent by weight of a flocculant for the clay mineral based on the total weight of solids in the suspension, said flocculant being a water-soluble anionic acrylic polymer, and a quantity of a water-soluble salt having a cation with a valency greater than one such that the concentration of the cation is in the range of from $0.001 \times 10^{-3}$ to $1.0 \times 10^{-3}$ gram ions/litre of suspension, (b) vigorously agitating the aqueous suspension, and (c) separating the flocculated clay mineral from the deflocculated quartz.

SEPARATION OF MINERALS

BACKGROUND OF INVENTION

This invention relates to the separation of mineral impurities from a clay mineral and, more particularly, is concerned with a method of separating quartz from clay minerals, especially layer silicates, containing the same.

The beneficiation of fine minerals, *i.e.* minerals predominantly consisting of particles not larger than 50 microns, is notoriously difficult to carry out and, although varying degrees of success can be achieved using mineral separation techniques originally developed for coarser minerals, for example froth flotaton or magnetic separation, there is still considerable room for improvement. It is particularly desirable to be able to separate quartz from a clay mineral, such as a kaolinitic clay mineral, because the quartz renders the clay abrasive and therefore unsuitable for use as, for example, a paper-coating pigment.

One phenomenon which is specific to fine particles is that they are capable of flocculation when formed into a suspension. Fine particles are said to be flocculated when there are net attractive forces between the such that the particles cluster together in flocs and settle under gravity collectively as flocs. The fine particles are said to be deflocculated when the interparticle forces are zero or repulsive and they settle under gravity as individual particles. The rate at which flocs settle is usually much greater than the rate at which single, deflocculated particles settle.

There are known processes for the selective flocculation of one mineral of a heterogeneous mixture of two or more minerals. For example, in British Pat. specification No. 748,212 there is described a method of fractionating a clay containing two of more clay components, each susceptible of deflocculation, which method comprises the steps of establishing an aqueous suspension of the clay in a condition whereunder the several clay components are all deflocculated, adjusting the condition of the suspension by the addition of a selective flocculating agent, which is a hydrophilic colloidal material having the property of forming a gel which dehydrates in the presence of a neutral salt, so as to effect flocculation of at least one but not all of the components, precipitating the flocculated portion, and separating the precipitate and the supernatant suspension. However, the conditions suitable for any particular heterogeneous mixture of two or more minerals cannot be foretold and, heretofore, the conditions for separating quartz from a clay mineral have not been disclosed. More particularly, it is found that the conditions and materials described in British Pat. specification No. 748,212 do not enable one to separate quartz from a clay mineral.

We have now found that it is possible to separate quartz from a clay mineral by a selective flocculation or selective deflocculation technique as described below.

SUMMARY OF THE INVENTION

More particularly, in accordance with the present invention, there is provided a method of separating quartz from a clay mineral containing the same as impurity, which method comprises the steps of (a) forming an aqueous suspension comprising not more than 20 percent by weight of the clay mineral containing the quartz impurity, from 0.05 to 0.5 percent by weight of a deflocculant based on the total weight of solids in the suspension, from 0.005 to 0.1 percent by weight of a flocculant for the clay mineral based on the total weight of solids in the suspension, said flocculant being a water-soluble anionic acrylic polymer, and a quantity of a water-soluble salt having a cation with a valency greater than one such that the concentration of the cation is in the range of from $0.001 \times 10^{-3}$ to $1.0 \times 10^{-3}$ gram ions/litre of suspension, (b) vigorously agitating the aqueous suspension, and (c) separating the flocculated clay mineral from the deflocculated quartz.

The invention is of particular value for the separation of fine quartz particles from kaolinitic clays. The method can also be used to separate quartz from halloysite, mica and dickite and other clays of the kandite and mica groups.

Preferably, the aqueous suspension comprises from 0.5 to 10 percent by weight of the clay mineral containing the quartz impurity.

The water-soluble salt having a cation with a valency greater than one can be, for example, a salt of cupric copper, calcium, strontium, barium, aluminum, lead or thorium. Preferably, the cation has an atomic weight of at least 27. Lead salts have been found to be the most effective. Preferably, the amount of the water-soluble salt in the suspension is such that the concentration of the cation is in the range $0.01 \times 10^{-3}$ to $0.5 \times 10^{-3}$ gram ions/litre of suspension.

The deflocculant used can be, for example, a polyphosphate, *e.g.* sodium hexametaphosphate or tetrasodium pyrophosphate, or a soluble salt of a polysilicic acid, *e.g.* sodium silicate, or a sodium polyacrylate having a molecular weight up to about 10,000. The amount of deflocculant used should be in the range 0.05 to 0.5 percent by weight based on the total weight of solids in the suspension. In general, the higher the pH at which the deflocculation is carried out, the lower the yield of the clay mineral fraction but at a higher purity. At a given pH the use of larger quantities of deflocculant results in a higher yield of clay mineral at a lower degree of purity.

The flocculants for the clay mineral which are used in the method of the invention are used in the method of the invention are water-soluble anionic acrylic polymers. Suitable materials include polyacrylates and salts of copolymers of acrylic acid with acrylamide, having a molecular weight of at least $10^5$ and preferably at least $10^6$. Preferably at least 1 percent of the active groups of the acrylic polymer are carboxyl groups. Examples of suitable water-soluble anionic acrylic polymers are Reten Al, which is manufactured by the Hercules Powder Company, and Magnafloc R139, R155 or R156, which are manufactured by Allied Colloids Manufacturing Company Limited. It has been found to be preferable, although not essential, to add the flocculant before the concentration of the water-soluble salt having a cation with a valency greater than one is raised to the required level. The amount of flocculant used should be in the range 0.005 to 0.1 percent by weight, based on the total weight of solids in the suspension. The optimum amount of flocculant to be used depends inter alia on the amount of the water-soluble salt of a cation having a valency greater than one and on the amount of deflocculant used. However, generally it is preferable if the amount of flocculant used does not exceed 0.05 percent by weight, based on the total weight of solids in the suspension.

In one embodiment of the invention, the method comprises the steps of (a) forming a suspension in water of the clay mineral containing fine quartz particles as impurity, the solids content of the suspension being less than 20 percent by weight, (b) adding the deflocculant to the suspension, (c) adding an alkali, such as sodium hydroxide, to adjust to the pH of the suspension to at least 8.0 and preferably to a value in the range 10.0 to 12.0, (d) adding the water-soluble salt containing a cation of valency greater than one, (e) adding the flocculant to the deflocculated suspension so as to flocculate the clay mineral whilst leaving the fine quartz particles deflocculated, (f) agitating the suspension vigorously, (g) allowing the clay mineral flocs to settle, and (h) separating the clay mineral flocs from the aqueous suspension of fine quartz particles.

In another embodiment of the invention, the method comprises the steps of (a) forming a suspension in water of the clay mineral containing fine quartz particles as impurity, the solids content of the suspension being less than 20 percent by weight, (b) reducing the pH of the suspension to below 5.0, and preferably below 4.0, (c) adding the water-soluble salt containing a cation of valency greater than one, (d) adding the flocculant so as to flocculate both the clay mineral and the fine quartz particles, (e) raising the pH of the suspension to at least 8.0, and preferably to a value in the range 10.0 to 12.0, (f) adding the deflocculant to the flocculated suspension so as to deflocculate the quartz particles whilst leaving the clay mineral flocculated, (g) agitating the suspension vigorously, (h) allowing the clay mineral flocs to settle, and (i) separating the clay mineral flocs from the aqueous suspension of fine quartz particles.

DESCRIPTION OF EMBODIMENTS

The invention is illustrated by the following examples.

EXAMPLE 1

A batch of ground quartz comprising particles passing a No. 325 mesh B.S. sieve was suspended in water containing $0.25 \times 10^{-3}$ gram ions of $Ca^{2+}$ per litre of suspension and 0.3 percent by weight of tetrasodium pyrophosphate, based on the weight of quartz, was added to deflocculate the quartz. The quartz was refined by gravitational sedimentation for a time sufficient to give a supernatant layer comprising particles less than 5 microns equivalent spherical diameter.

A second suspension was containing (a) 10 gm. per 100 ml. of suspension of a quartz-free china clay comprising 85 percent by weight of particles smaller than 2 microns equivalent spherical diameter and 0.2 percent by weight of particles larger than 10 microns equivalent spherical diameter, (b) 0.3 percent by weight, based on the weight of china clay, of tetrasodium pyrophosphate as deflocculant, and (c) $0.25 \times 10^{-3}$ gram ions of $Ca^{2+}$ per litre of suspension.

Three samples were prepared, in each case by mixing 70 ml. of the china clay suspension with a volume of the quartz suspension containing 3 gm. of quartz, and then diluting the mixture to 1 litre with water containing $0.25 \times 10^{-3}$ gram ions of $Ca^{2+}$ per litre of suspension. The pH of each sample was adjusted to 9.0 with sodium hydroxide, and a water-soluble anionic acrylic polymer flocculant, viz. the copolymer manufactured by the Hercules Powder Company under their trade mark Reten Al, was added to the three suspensions in quantities of 1, 5 and 10 mg. per litre of suspension, respectively. Each suspension was then shaken vigorously for 1 minute and left to stand for 30 minutes, after which time the supernatant fluid containing principally quartz was poured off leaving the substantially pure, flocculated china clay. The recovery yields were calculated for quartz by X-ray diffraction. The results obtained are shown in table I.

TABLE I

| Mg. of anionic acrylic polymer per litre of suspension | Flocculated fraction | | Deflocculated fraction | |
|---|---|---|---|---|
| | Recovery of solids | Quartz content | Recovery of solids | Quartz content |
| 1 | 54 | 7 | 46 | 60 |
| 5 | 64 | 9 | 36 | 65 |
| 10 | 62 | 11 | 38 | 75 |

EXAMPLE 2

Three samples were prepared by mixing, in each case, 70 ml. of the china clay suspension used in example 1 with a volume of the quartz suspension used in example 1 containing 3 gm. of quartz, and then diluting the mixture to 1 litre with water containing $0.25 \times 10^{-3}$ gram ions of $Ca^{2+}$ per litre of suspension. The pH of each sample was adjusted to 3.0 with sulphuric acid. A water-soluble anionic acrylic polymer flocculant, viz. Reten Al, was added to the suspensions in concentrations of 1, 5 and 10 mg. per litre of suspension, respectively, to flocculate completely all the quartz and china clay. The pH was then raised to 9.0 with sodium hydroxide and tetrasodium pyrophosphate deflocculant was added in a quantity equal to 0.3 percent by weight based on the total weight of quartz and china clay. The samples were vigorously shaken for 30 seconds and left to stand for 30 minutes after which time the supernatant and flocculated fractions were separated. The recovery and quartz content of the flocculated fractions are shown in table II below.

TABLE II

| Mg. of anionic acrylic polymer per litre of suspension | Flocculated fraction | |
|---|---|---|
| | Recovery of solids | Quartz content |
| 1 | 16 | 13 |
| 5 | 56 | 15 |
| 10 | 56 | 17 |

EXAMPLE 3

Suspensions of quartz and china clay were prepared in the same way as in example 1 and 2 except that deionised water was used. Five samples were prepared using the same proportions of the china clay and quartz suspensions as were used in examples 1 and 2 but using deionised water for diluting the samples to 1 litre. The pH of each sample was adjusted to 10.0 and calcium chloride was then added to four of the samples in quantities equivalent to $0.25 \times 10^{-3}$, $0.50 \times 10^{-3}$, $0.75 \times 10^{-3}$ and $1.00 \times 10^{-3}$ gm. ions of $Ca^{2+}$ per litre of suspension, respectively. No calcium chloride was added to the fifth sample. There was then added to each sample 5 mg. of Reten Al flocculant per litre of suspension. The samples were shaken vigorously for 1 minute and were then allowed to stand for 30 minutes, after which time the supernatant and flocculated fractions were separated. The recovery and quartz content of the flocculated fractions are shown in table III below.

TABLE III

| | Flocculated fraction | |
|---|---|---|
| | Recovery of solids | Quartz content |
| Concentrations of $Ca^{2+}$ ion in gm. ion/litre of suspension $\times 10^3$: | | |
| 0 | No flocs | |
| 0.25 | 30 | 13 |
| 0.50 | 57 | 13 |
| 0.75 | 55 | 18 |
| 1.00 | 62 | 20 |

It was found that no flocs were formed when Reten Al flocculant was added to the sample prepared using deionised water.

EXAMPLE 4

A batch of the ground quartz used in examples 1—3 was suspended in deionised water containing 0.13 percent by weight of sodium silicate based on the weight of quartz, and refined to give a product predominantly comprising particles smaller than 5 microns equivalent spherical diameter.

A second suspension was prepared containing 10 gm. per 100 ml. of suspension of the same china clay used in examples 1—3 deflocculated with 0.13 percent by weight of sodium silicate based on the weight of china clay and using deionised water.

Five samples were prepared, in each case by mixing 70 ml. of the china clay suspension with a volume of the quartz suspension containing 3 gm. of quartz, and then diluting the mixture to 1 litre with deionised water. The pH of each sample was adjusted to 10.0 and one of the following water-soluble salts was added to each sample in a quantity equivalent to a cation concentration of $0.25 \times 10^{-3}$ gm. ion per litre of suspension; the salts used were calcium chloride, strontium chloride, barium chloride, lead acetate and sodium chloride. There was then added to each sample 2 mg. of Reten Al flocculant per litre of suspension. The samples were shaken vigorously for 1 minute, and were then allowed to stand for 30 minutes, after which time the supernatant and flocculated fractions were separated. The recovery yield and quartz content of the flocculated fractions are shown in table IV below.

TABLE IV

| | Flocculated fraction | |
|---|---|---|
| | Recovery of solids | Quartz content |
| Cation added: | | |
| $Ca^{2+}$ | 63 | 20 |
| $Sr^{2+}$ | 81 | 15 |
| $Ba^{2+}$ | 73 | 16 |
| $Pb^{2+}$ | 72 | 11 |
| $Na^+$ | 58 | 33 |

It will be noted that the plumbous lead ion gave the best separation and that the strontium and barium ions were only slightly less effective.

EXAMPLE 5

Three samples were prepared in a similar way to those used in example 4 except that the soluble salt added in each case was lead acetate in a quantity equivalent to a $Pb^{2+}$ concentration of 0.125 gm. ion per litre of suspension. There was then added to the samples Reten Al flocculant in concentrations of 1, 2 and 3 mg./litre of suspension, respectively, and the separation was effected in the same way as in example 4. The recovery yield and quartz contents of the flocculated fraction are shown in table V below.

TABLE V

| Mg. of anionic acrylic polymer per litre of suspension | Flocculated fraction | |
|---|---|---|
| | Recovery of solids | Quartz content |
| 1 | 66 | 7 |
| 2 | 67 | 9.5 |
| 3 | 66 | 7 |

The results show that the quantity of Reten Al flocculant is not critical in the range 1—3 mg. per litre of suspension (0.01—0.03 percent by weight based on the weight of solids).

EXAMPLE 6

Four samples were prepared in the same way as in example 3 using suspensions of quartz and china clay deflocculated with 0.3 percent by weight of tetrasodium pyrophosphate. Different quantities of sodium hydroxide were added to each sample to give pH values of 7.0, 8.0, 10.0 and 11.0 respectively. Calcium chloride was added to each sample to give a concentration of $Ca^{2+}$ ions of $0.5 \times 10^{-3}$ gm. ion per litre of suspension and 5 mg. of Reten Al flocculant per litre of suspension was then added to each sample, and the mixtures vigorously shaken for 1 minute. The separation was effected in the same way mark Magnafloc in example 4 and the recovery yield and quartz contents of the flocculated fraction are shown in table VI.

TABLE VI

| | Flocculated fraction | |
|---|---|---|
| pH | Recovery of solids | Quartz content |
| 7 | 63 | 29 |
| 8 | 48 | 16 |
| 10 | 57 | 13 |
| 11 | 47 | 12 |

EXAMPLE 7

Four samples were prepared in the same way as in example 3 using suspensions of quartz and china clay deflocculated with 0.3 percent by weight of tetrasodium pyrophosphate. The pH was adjusted to 10.0 with sodium hydroxide, and calcium chloride was added to each sample to give a concentration of $Ca^{2+}$ ions of $0.5 \times 10^{-3}$ gm. ion per litre of suspension. To the samples there were then added 5 mg. per litre of suspension, of a water-soluble anionic acrylic polymer flocculant, viz. the copolymer of acrylamide and acrylic acid in the sodium salt form manufactured by Allied Colloids Manufacturing Co. Ltd. and sold under their trade mark Magnofloc R139. The degree of agitation applied to the samples after addition of the polymer was varied. One sample was stirred by hand and the others were shaken vigorously for one-half minute, 1 minute and 5 minutes respectively. The separation was then effected as in the previous examples and the recovery yield and quartz content of the flocculated fraction are shown in table VII below.

TABLE VII

| | Flocculated fraction | |
|---|---|---|
| | Recovery of solids | Quartz content |
| Agitation: | | |
| Hand stirred | 54 | 27 |
| Shaken vigorously ½ min | 63 | 20 |
| Shaken vigorously 1 min | 63 | 16 |
| Shaken vigorously 5 mins | 58 | 17 |

EXAMPLE 8

In most practical cases the quantities of quartz encountered in naturally occurring, impure china clays will be on the order of 1—5 percent by weight and a mixture containing 5 percent by weight of quartz was therefore prepared in the following manner. A batch of ground quartz comprising particles passing a No. 325 mesh B.S. sieve was suspended in deionised water containing 0.13 percent by weight of sodium silicate based on the weight of quartz, and refined to give a product predominantly comprising particles smaller than 5 microns equivalent spherical diameter. A second suspension was prepared containing 10 gm. per 100 ml. of suspension of the same china clay used in the previous examples deflocculated with 0.13 percent by weight of sodium silicate based on the weight of china clay. Four samples were prepared, in each case by mixing 95 ml. of the china clay suspension with a volume of quartz suspension containing 0.5 mg. of quartz, and then diluting the mixture of 1 litre with deionised water. The pH of the suspension was adjusted to 10.0 with sodium hydroxide, and lead acetate was added to the sample in concentrations of $0.0312 \times 10^{-3}$, $0.0625 \times 10^{-3}$, $0.125 \times 10^{-3}$ and $0.25 \times 10^{-3}$ gm. ion of $Pb^{2+}$ per litre of suspension, respectively. To each sample there was then added 1 mg. of Reten Al flocculant and the separation was effected as in the previous examples. The recovery yield and quartz content of the flocculated fractions are shown in table VIII.

TABLE VIII

| | Flocculated fraction | |
|---|---|---|
| | Recovery of solids | Quartz content |
| $Pb^{2+}$ ion gm. ion per litre of suspension $\times 10^3$: | | |
| 0.0312 | 75 | 1.1 |
| 0.0625 | 66 | 1.4 |
| 0.125 | 80 | 1.7 |
| 0.25 | 90 | 1.5 |

EXAMPLE 9

Two samples were prepared in the same way as in example 8 but using water containing $0.25 \times 10^{-3}$ gm. ion per litre of $Ca^{2+}$ ions. The pH of each sample was adjusted to 10.0 and the copolymer of acrylamide and acrylic acid in the sodium salt form manufactured by Allied Colloids Manufacturing Co. Ltd. and sold under trade mark Magnafloc R156 was added to the samples in concentrations of 1 and 2 mg./litre of suspension, respectively. The separation was effected as in the previous examples and the recovery yield and quartz content of the flocculated fractions are shown in table IX below.

TABLE IX

| Mg. of anionic acrylic polymer per litre of suspension | Flocculated fraction | |
|---|---|---|
| | Recovery of solids | Quartz content |
| 1 | 93 | 2.8 |
| 2 | 91 | 2.8 |

I claim:

1. A method of separating quartz from a clay mineral containing the same as impurity, which method comprises the steps of (a) forming an aqueous suspension comprising not more than 20 percent by weight of the clay mineral containing the quartz impurity, from 0.05 to 0.5 percent by weight of a deflocculant based on the total weight of solids in the suspension, from 0.005 to 0.1 percent by weight of a flocculant for the clay mineral based on the total weight of solids in the suspension, said flocculant being a water-soluble anionic acrylic polymer having a molecular weight of at least $10^5$ and being selected from the group consisting of polyacrylate salts and salts of copolymers of acrylic acid and acrylamide, and a quantity of a water-soluble salt having a cation with a valency greater than one such that the concentration of the cation is in the range of from $0.001 \times 10^{-3}$ to $1.0 \times 10^{-3}$ gram ions/litre of suspension, (b) vigorously agitating the aqueous suspension, and (c) separating the flocculated clay mineral from the deflocculated quartz.

2. A method according to claim 1, wherein the clay mineral is a kaolinitic clay.

3. A method according to claim 1, wherein the aqueous suspension comprises from 0.5 to 10 percent by weight of the clay mineral containing the quartz impurity.

4. A method according to claim 1, wherein the water-soluble salt has a cation with an atomic weight of at least 27.

5. A method according to claim 4, wherein the water-soluble salt is a lead salt.

6. A method according to claim 1, wherein said method comprises the steps of (a) forming a suspension in water of the clay mineral containing fine quartz particles as impurity, (b) adding the deflocculant to the suspension, (c) adding an alkali to the suspension to adjust the pH of the suspension to at least 8.0, (d) adding the water-soluble salt containing a cation of valency greater than one to the suspension, (e) adding the water-soluble anionic acrylic polymer flocculant to the deflocculated suspension so as to flocculate the clay mineral whilst leaving the fine quartz particles deflocculated, (f) agitating the suspension vigorously, (g) allowing clay mineral flocs to settle, and (h) separating the clay mineral flocs from the aqueous suspension of fine quartz particles.

7. A method according to claim 6, wherein the clay mineral is a kaolinitic clay.

8. A method according to claim 6, wherein the aqueous suspension comprises from 0.5 to 10 percent by weight of the clay mineral containing the quartz impurity.

9. A method according to claim 6, wherein the water-soluble salt has a cation with an atomic weight of at least 27.

10. A method according to claim 9, wherein the water-soluble salt is a lead salt.

11. A method according to claim 1, wherein said method comprises the steps of (a) forming a suspension in water of the clay mineral containing fine quartz particles as impurity, (b) reducing the pH of the suspension to below 5.0, (c) adding the water-soluble salt containing a cation of valency greater than one to the suspension, (d) adding the water-soluble anionic acrylic polymer flocculant to the suspension so as to flocculate both the clay mineral and the fine quartz particles, (e) raising the pH of the suspension to at least 8.0, (f) adding the deflocculant to the flocculated suspension so as to deflocculate the quartz particles whilst leaving the clay mineral flocculated, (g) agitating the suspension vigorously, (h) allowing the clay mineral flocs to settle, and (i) separating the clay mineral flocs from the aqueous suspension of fine quartz particles.

12. A method according to claim 11, wherein the clay mineral is a kaolinitic clay.

13. A method according to claim 11, wherein the aqueous suspension comprises from 0.5 to 10 percent by weight of the clay mineral containing the quartz impurity.

14. A method according to claim 11, wherein the water-soluble salt has a cation with an atomic weight of at least 27.

15. A method according to claim 14, wherein the water-soluble salt is a lead salt.